(12) United States Patent
James

(10) Patent No.: US 10,174,472 B2
(45) Date of Patent: Jan. 8, 2019

(54) ENERGY ABSORPTION DEVICE

(71) Applicant: Valmont Highway Technology Limited, Auckland (NZ)

(72) Inventor: Dallas Rex James, Auckland (NZ)

(73) Assignee: VALMONT HIGHWAY TECHNOLOGY LIMITED, Auckland (NZ)

( * ) Notice: Subject to any disclaimer, the term of this patent is extended or adjusted under 35 U.S.C. 154(b) by 0 days.

(21) Appl. No.: 14/582,485

(22) Filed: Dec. 24, 2014

(65) Prior Publication Data

US 2015/0107947 A1   Apr. 23, 2015

Related U.S. Application Data

(62) Division of application No. 13/263,485, filed as application No. PCT/NZ2010/000064 on Apr. 7, 2010, now Pat. No. 9,163,369.

(30) Foreign Application Priority Data

Apr. 7, 2009 (NZ) ........................................ 576140

(51) Int. Cl.
*E01F 15/08* (2006.01)
*F16F 7/12* (2006.01)
*E01F 15/14* (2006.01)

(52) U.S. Cl.
CPC .......... *E01F 15/086* (2013.01); *E01F 15/085* (2013.01); *E01F 15/141* (2013.01); *F16F 7/12* (2013.01)

(58) Field of Classification Search
CPC ... F16F 7/12; F16F 7/121; E01F 15/14; E01F 15/141; E01F 15/145; E01F 15/146;
(Continued)

(56) References Cited

U.S. PATENT DOCUMENTS 3,503,600 A * 3/1970 Rich ..................... E01F 15/141
                                                104/254
4,029,350 A    6/1977 Goupy et al.
(Continued)

FOREIGN PATENT DOCUMENTS

DE   19856162       6/2000
EP   1426289 A1    6/2004
(Continued)

OTHER PUBLICATIONS

European Search Report for European Patent Application No. 10761919.9-1755 / 2417299 dated Apr. 2, 2015.

*Primary Examiner* — Thomas J Williams
(74) *Attorney, Agent, or Firm* — Greer, Burns & Crain, Ltd.

(57) ABSTRACT

A method of absorbing energy from a moving object upon impact, where the method includes utilizing at least two types of energy absorbing elements to absorb at least some of the energy of the impact in an energy absorbing apparatus. A first type of energy absorbing element absorbs the majority of the energy absorbed by the apparatus and subsequent types of energy absorbing elements continue to absorb energy after the first type of energy absorbing element has ceased operation and can no longer absorb energy.

14 Claims, 4 Drawing Sheets

(58) Field of Classification Search
CPC ....... E01F 15/08; E01F 15/086; E01F 15/085; E01F 15/143
USPC .......................... 188/371, 376, 377; 256/13.1
See application file for complete search history.

(56) References Cited

U.S. PATENT DOCUMENTS

| | | | |
|---|---|---|---|
| 4,118,014 A | | 10/1978 | Frosch et al. |
| 4,492,291 A | | 1/1985 | Chometon et al. |
| 4,645,375 A | * | 2/1987 | Carney, III ............ E01F 15/146 188/377 |
| 4,880,088 A | * | 11/1989 | De Oliveira .......... E02B 17/003 188/377 |
| 4,929,008 A | * | 5/1990 | Esfandiary ............. B60R 19/20 188/376 |
| 5,193,246 A | | 3/1993 | Huang |
| 5,355,552 A | | 10/1994 | Huang |
| 5,404,974 A | * | 4/1995 | Thum ..................... B60R 19/18 188/372 |
| 5,605,413 A | | 2/1997 | Brown |
| 5,779,389 A | | 7/1998 | Niemerski |
| 5,804,030 A | | 9/1998 | Jaegers et al. |
| 6,481,920 B1 | * | 11/2002 | Leonhardt ............... B60R 19/00 256/13.1 |
| 6,581,992 B1 | * | 6/2003 | Gertz ...................... B60R 19/00 256/13.1 |
| 6,932,537 B2 | | 8/2005 | Witcher |
| 6,959,894 B2 | | 11/2005 | Hayashi |
| 7,070,030 B2 | * | 7/2006 | Etcheverry ......... B60R 21/0428 188/371 |
| 2003/0095834 A1 | | 5/2003 | Witcher |
| 2004/0051366 A1 | | 3/2004 | Hsin |
| 2004/0195064 A1 | | 10/2004 | Tamada et al. |
| 2005/0001093 A1 | | 1/2005 | Hayashi |
| 2006/0099030 A1 | * | 5/2006 | Yamasaki ............. E01F 15/146 404/6 |
| 2008/0203749 A1 | | 8/2008 | Tamada |
| 2010/0287715 A1 | | 11/2010 | Voyiadjis et al. |
| 2013/0175128 A1 | * | 7/2013 | Kumar ................... B60R 19/18 188/377 |

FOREIGN PATENT DOCUMENTS

| | | | |
|---|---|---|---|
| EP | 2505490 | 3/2012 | |
| GB | 940684 A | * 10/1963 | ............. B60G 11/22 |
| GB | 1492752 A | * 11/1977 | ............ E01F 15/145 |
| WO | 9955970 A1 | 11/1999 | |
| WO | 2002040779 | 5/2002 | |

* cited by examiner

ENERGY ABSORPTION DEVICE

PRIORITY CLAIM

This application is a divisional application of and claims the benefit of U.S. patent application Ser. No. 13/263,485 filed on Jan. 5, 2012, which is a § 371 application of and claims the benefit of PCT Application No. PCT/NZ2010/000064 filed on Apr. 7, 2010, which claims priority to and the benefit of New Zealand Application No. 576140 filed on Apr. 7, 2009, all of which are incorporated herein in their entireties.

TECHNICAL FIELD

This invention relates to an energy absorbing device.

BACKGROUND

A wide variety of energy absorbing apparatus are available for use in situations where it is desirable to absorb the energy of an impact.

For ease of reference only, the present invention will now be described with regard to roading applications, where impact of an erratic vehicle with a stationary object, (such as for example only: a wall, utility, pole or tree) can cause severe injury and/or death to occupants travelling in the vehicle. Similarly, vehicles that have been driven off course may be significantly slowed down by contact with an energy absorbing apparatus, reducing the danger when entering areas of risk, particularly at high speeds.

Vehicle collisions with stationary objects are a large contributor to deaths and serious injuries. To reduce the damage to occupants during a collision, a number of assemblies have been devised to absorb and/or transfer the energy from the impact.

It is well known to use containers filled with water or sand as energy absorbing devices between roadways and stationary objects. One of the major disadvantages of this system is that the devices are relatively heavy, and in the case of the water filled devices, often difficult to maintain.

It is also well known to use air tight containers to absorb impact energy. These are somewhat effective, however once the container has had an initial impact and the container shattered or broken, there is no further way that energy can continue to be absorbed. These containers are known to be used both on land and sea, however they are not particularly effective when receiving a high energy impact.

U.S. Pat. No. 5,123,775 describes an impact attenuator to absorb the impact of vehicular collisions. The device described in this patent includes a fibreglass shell which defines a cavity in the interior thereof. Housed within the cavity is a plurality of layers of empty aluminium beverage cans. Each layer consists of a plurality of cans stacked end to end in a number of columns in the direction of anticipated impact. Each of the layers is then separated by a cardboard divider to maintain separation between the layers, and the assembled cans are then surrounded by a burlap shroud before being encased within the fibreglass shell.

This assembly has a number of disadvantages. As the aluminium cans are stacked end to end within the layers, the device will only function at its most effective when the collision occurs in a direction which is head-on into the end of the cans. This limits the types of situation where this assembly can be used and also may increase risk to a vehicle occupant if the apparatus is impacted from the non-preferable angle. Additionally as the individual layers of cardboard and cans are not fixed together, the energy absorbed on impact is not readily transferred throughout all layers of the device, limiting the effectiveness of the entire device to absorb impact. This system is also fairly labour intensive to produce, as individual cans need to be correctly positioned within columns and then layers, with cardboard dividers. The can and cardboard interior needs to then be encased in a burlap sack, then inserted within a fibreglass shell, making the process of producing the assembly time consuming and labour intensive.

A number of other roading barriers are known, such as those constructed using tyres. One such longitudinal barrier is described in WO 03/097964. This patent specification describes a longitudinal barrier constructed from a plurality of tyres that are configured in a staggered brick type fashion or are stacked on top of each other to form columns. The tyres are held in position by a series of cables, wire rope, or stakes depending on the configuration of the tyres. One disadvantage with this system is that tyres solely absorb the impact of a vehicle. For example the energy of the impact is only transferred to horizontally adjacent tyres via upright supports (binding devices 16, 26 or 47) The binding devices have a small surface area so the transfer of force to a tyre is limited. This invention is also labour intensive as it requires holes 13 to be cut into the tyres, refer to FIGS. 1, 3 and 5. Once the tyres have had holes introduced to them, there is a reduction in the amount of energy that can be absorbed or transferred through the system, further reducing the effectiveness of the tyres in absorbing impact. The barrier of WO 03/097964 is also limited slightly in that it is not surrounded by an outer shell or casing. The addition of an outer casing or shell seals the air inside the barrier, providing further resistance when the barrier is absorbing an impact.

In summary, the problem with the prior art assemblies such as shown in U.S. Pat. No. 5,123,775 and WO 03/097964 is the fact the vehicle itself still has to absorb the majority of the force of impact, which cannot be transferred or absorbed by the assembly, for the reasons mentioned above. In the case of U.S. Pat. No. 5,123,755 the impact absorption efficiency is limited is by the aluminium cans not being connected to either each other or the layered cardboard. On impact, the cans may fall apart from each other once the fibreglass housing has been shattered, further increasing the energy that needs to be absorbed by the vehicle instead of the barrier. These problems occur due to both prior art assemblies relying on the resilience of the individual materials to absorb the majority of the impact. Each of the above assemblies are also potentially time consuming and labour intensive to manufacture on a large scale.

It would therefore be useful to have an assembly where the elements within the assembly are all interconnected in such a way, to increase the amount of energy that is absorbed and/or transferred to the assembly from an impacting vehicle, thereby decreasing the amount of force conveyed back to the occupants of the colliding vehicle. Additionally, it would also be an advantage to have an assembly that could be quickly and easily manufactured using readily available materials. It would be a further advantage to have an assembly that could be constructed in a range of shapes, such as; circular, square; a line, to suit a range of applications, without being expensive to construct.

Conventional energy absorbing apparatus and road barriers including those as described above only utilise a single type of energy absorbing element. It would also be useful if there could be provided an energy absorbing device which can utilise at least 2 types of energy absorbing elements.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

SUMMARY

According to one aspect of the present invention there is provided an energy absorbing device having a shell comprising at least one external wall defining an internal area, wherein said internal area is further defined by one or more interior wall(s) spanning across at least a portion of said internal area between opposing sections of said external wall(s).

According a further aspect of the present invention there is provided an energy absorbing device wherein said interior wall(s) define a further space within the interior area of the shell.

In further preferred embodiments the one or more interior wall(s) span between opposing external walls of the shell such that the internal space spans across the shell.

Most preferably, in use, the further space spans across the shell in a direction substantially parallel or orthogonal to the general direction in which an impact is expected.

The further space is in most embodiments generally open to the ambient environment. However, in some further embodiments the further space may be sealed by a section of the shell.

According to another aspect of the present invention there is provided a method of manufacturing a device to absorb impact energy, characterised by the step of creating a shell comprising at least one external wall defining an internal area, wherein said internal area is further defined by one or more interior walls spanning across at least a portion of said internal area between opposing sections of said wall(s).

For the purposes of this invention the term "wall" should be taken to mean any surface that can be used to define a space or act as a boundary between spaces.

In a preferred embodiment of the invention, the shell is made from substantially inflexible material. Ideally, the material should be capable of being compressed when impacted by a force of sufficient magnitude. For example, in roading applications a force of sufficient magnitude will exist when a vehicle collides with the energy absorbing device.

In preferred embodiments the material from which the shell is made may be moulded plastic, such as for example only, medium density polyethylene. In some alternative embodiments the shell material may be metal.

It will be appreciated by those skilled in the art that this list of possible materials from which the shell may be made is not intended to be exhaustive nor limiting.

It will also be appreciated by those skilled in the art that what constitutes a force of sufficient magnitude will vary depending on the situation in which the energy absorbing device is designed to absorb energy. Thus, the type and thickness of material may vary depending on the situation.

In further preferred embodiments the shell is substantially airtight. The inventor has found that air trapped within the internal area can provide, a degree of resistance to the force of an impact from an oncoming vehicle or similar, during the period that the air is compressed within the internal area, upon deformation of the shell.

The shell and air (or other compressible fluid) housed within therefore constitutes a first type of energy absorbing element. In such further preferred embodiments the interior walls also become compressed during an impact to constitute a second type of energy absorbing element. If the further space created by the interior walls is sealed any air or other compressible fluid housed within can constitute a third type of energy absorbing element.

Preferably, the shell is substantially rectangular in shape, although it is envisioned that the housing may be made into any shape as may be needed for a specific site or area to be protected.

The interior walls of the energy absorbing device are preferably formed from a substantially inflexible material which is the same or similar to that as those used in the shell. This is not however intended to be limiting and the internal walls may be formed from a different material to that of the external walls.

It is envisaged the further space formed by the interior walls may have a variety of different cross-sectional shapes.

In preferred embodiments the further space may have a substantially circular or octagonal cross-sectional shape. However, it should be appreciated that the interior walls may form further spaces with other cross-sectional shapes such as triangular, square or hexagonal, without departing from the scope of the present invention.

In variations of the apparatus of the present invention it is envisioned that the shell may contain a plurality of further spaces created by internal walls.

In an embodiment where the device includes more than one further space, it is preferable that the further spaces defined by interior walls are orientated to be aligned parallel with respect to each other within the internal area of the shell.

In one embodiment of the invention the exterior and interior walls may be integrally formed. Alternatively, in other variations the exterior walls may be formed separately and filled with circular or octagonal tubing to create the interior walls.

The energy absorbing device of the present invention, in addition to being used on its own, may also be used as an individual energy absorbing module that may be inserted within a further safety device to increase the efficiency of a barrier or crash cushion.

According to a further aspect of the present invention there is provided a housing adapted for surrounding stationary objects wherein said housing includes a number of energy absorbing devices substantially as described above. For example, the stationary object may be a tree or pole. The housing may be configured as a module which can connect to one or more other modules to provide an impact cushion which can surround the stationary object. In such embodiments the housing may include a connecting portion for attaching to adjacent modules.

Alternatively, the shell of may be configured to function as a module without the need for a separate housing. For example, the shell may have a connecting portion which attaches to an adjacent module such that a number of modules may be arranged and fastened together without the need for additional surrounding housing. In this embodiment the modules may be configured for attachment such that the individual modules can be linked together in a row or stacked to form a larger energy absorbing device. The modules may be attached together by means of cables, wires, hooks or click-fit arrangements as would be understood be a person skilled in the art.

According to another aspect of the present invention there is provided a method of surrounding a stationary object the method comprising connecting two or more:
  housings substantially as described above; or
  energy absorbing devices substantially as described above;
so as to surround the stationary object.

According to a further aspect of the present invention there is provided a method of absorbing energy from a moving object upon impact wherein the method comprises the step of: utilising at least two types of energy absorbing elements to absorb the energy of the impact in an energy absorbing apparatus; wherein the first type of element can absorb at least 50-90% of the energy absorbed by the apparatus and wherein the subsequent type(s) of element continues to absorb energy after the first type of energy absorbing element(s) has/have ceased operation and can no longer absorb energy.

Preferred embodiments of the device of the present invention may have a number of advantages over the energy absorbing devices currently known. The interior walls of the device provide additional energy absorption to the housing when absorbing an impact. After an initial impact which may destroy the housing of the device, the interior walls and/or further space provide energy absorbing zones, decreasing the amount of energy needing to be reabsorbed by the impacting vehicle or similar.

In the preferred embodiments the interior walls are substantially tubular in shape and can therefore effectively absorb impact energy from almost any direction, making the device suitable for use in a wide range of situations.

Preferred embodiments of the device are also advantageous over other known energy absorption apparatus in that they can be used on both land and water. When manufactured from plastics material the device of the present invention can float and is therefore suitable for impact absorption in marine environments. For example, the present invention can be used as a boat racing crash barrier or as protection around stationary objects such as wharves.

Preferred embodiments of the present invention are also economical, lightweight and relatively simple to produce and can easily be moved and replaced when necessary.

BRIEF DESCRIPTION OF THE DRAWINGS

Further aspects of the present invention will become apparent from the following description which is given by way of example only and with reference to the accompanying drawings in which.

DETAILED DESCRIPTION

Figure 1:
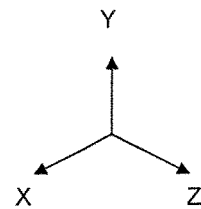
FIG. 1 shows a perspective view of the energy absorbing device of the present invention.
Figure 1:
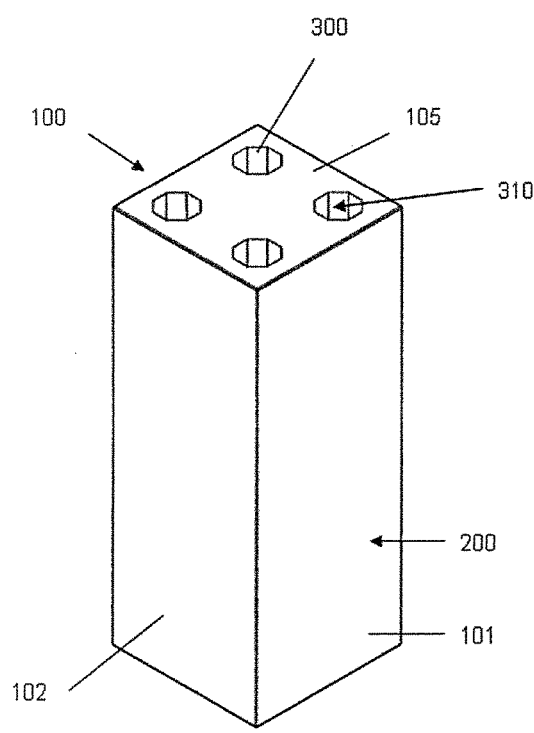
Figure 2:
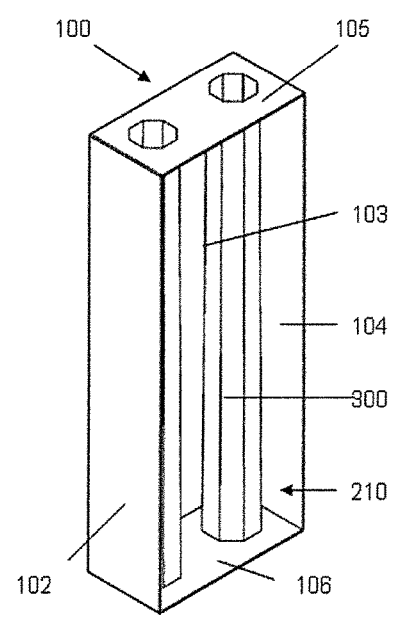
FIG. 2 shows a perspective cross-section of the energy absorbing device of FIG. 1.

FIGS. 1 and 2 show an energy absorption device 100 in accordance with one preferred embodiment of the present invention. The energy absorption device 100 is made from medium density polyethylene and has 6 external walls 101-106 which form an outer rectangular shell 200. As best seen in FIG. 2 the shell 200 defines a first internal area 210 that acts as an air cushion when the device 100 is sealed on all sides as shown in FIG. 1.

The first internal area 210 is further defined by interior walls 300. As shown in FIGS. 1 and 2, interior walls 300 span across internal area 210 of the shell, running parallel between opposing sides of the shell 200. Interior walls 300 are octagonal in shape and define a space 310 within interior walls 300. In this embodiment there are four interior walls 300 shown, however it is envisioned that there may be any number of interior walls 300 located within shell 200.

In use, device 100 may be positioned to receive an impact from direction X, Y or Z or any angle in between as indicated by the axis in FIG. 1. On impact, shell 200 contains air which is compressed by the initial energy of impact and this absorbs the majority of the impact energy then when the shell ruptures the remaining impact energy is transferred to (i.e. absorbed by) interior walls 300 which get crushed, absorbing more energy from the impact. As would be appreciated by a person skilled in the art, the more interior walls 300 positioned within housing 200 the more surfaces will be available for absorbing impact energy.

The devices 100 of the present invention may also be used as modules arranged within a further housing or arranged together to form a larger energy absorbing device.

Figure 3:
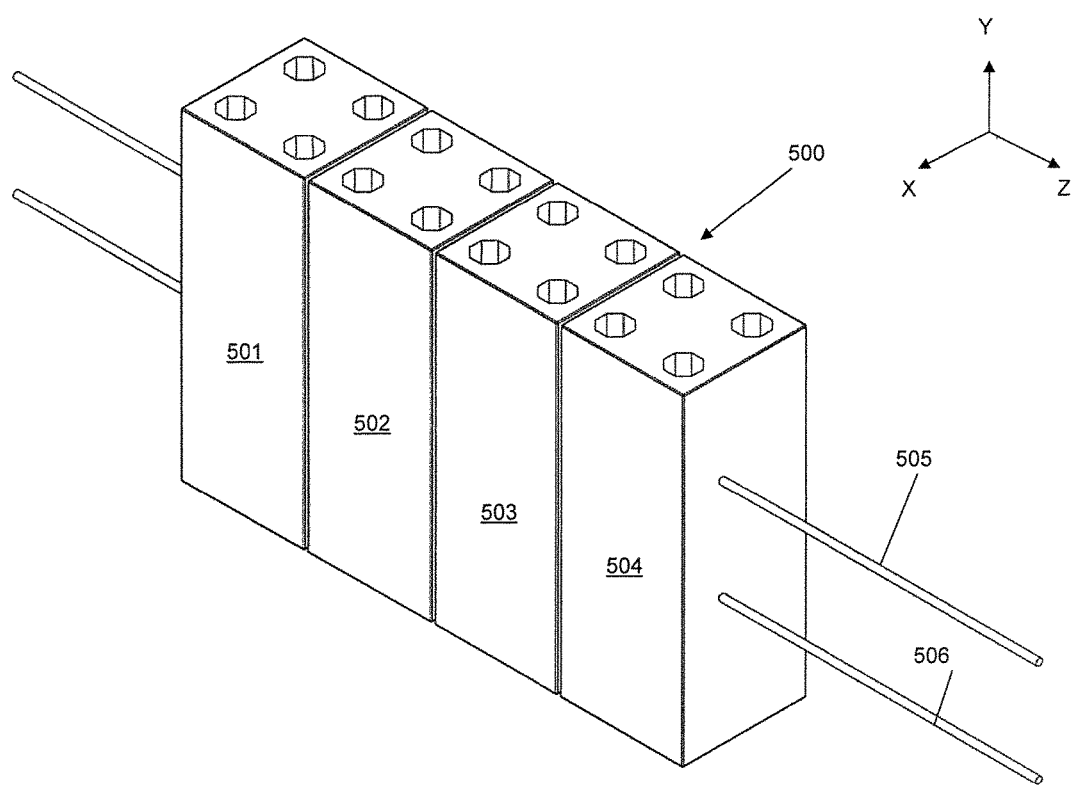
FIG. 3 shows a perspective view of modular safety device in accordance with one preferred embodiment which includes a number of energy absorbing devices as shown in FIG. 1.

FIG. 3 shows a modular safety device generally indicated by arrow 500. The modular safety device 500 has four energy absorbing devices 501-504 which are connected by cables 505 and 506 which pass through apertures (not shown) in the energy absorbing devices 501-504. The modular safety device 500 in use can be wrapped around an object (not shown).

For example the modular safety device 500 can have multiple energy absorbing elements and can be wrapped around a power pole (not shown) one or more times to create one or more protective layers about the pole.

Although not shown it should be appreciated that the energy absorbing elements 500 can also be orientated so as to absorb the energy of an impact along the longitudinal axis of the device 500.

Figure 4:
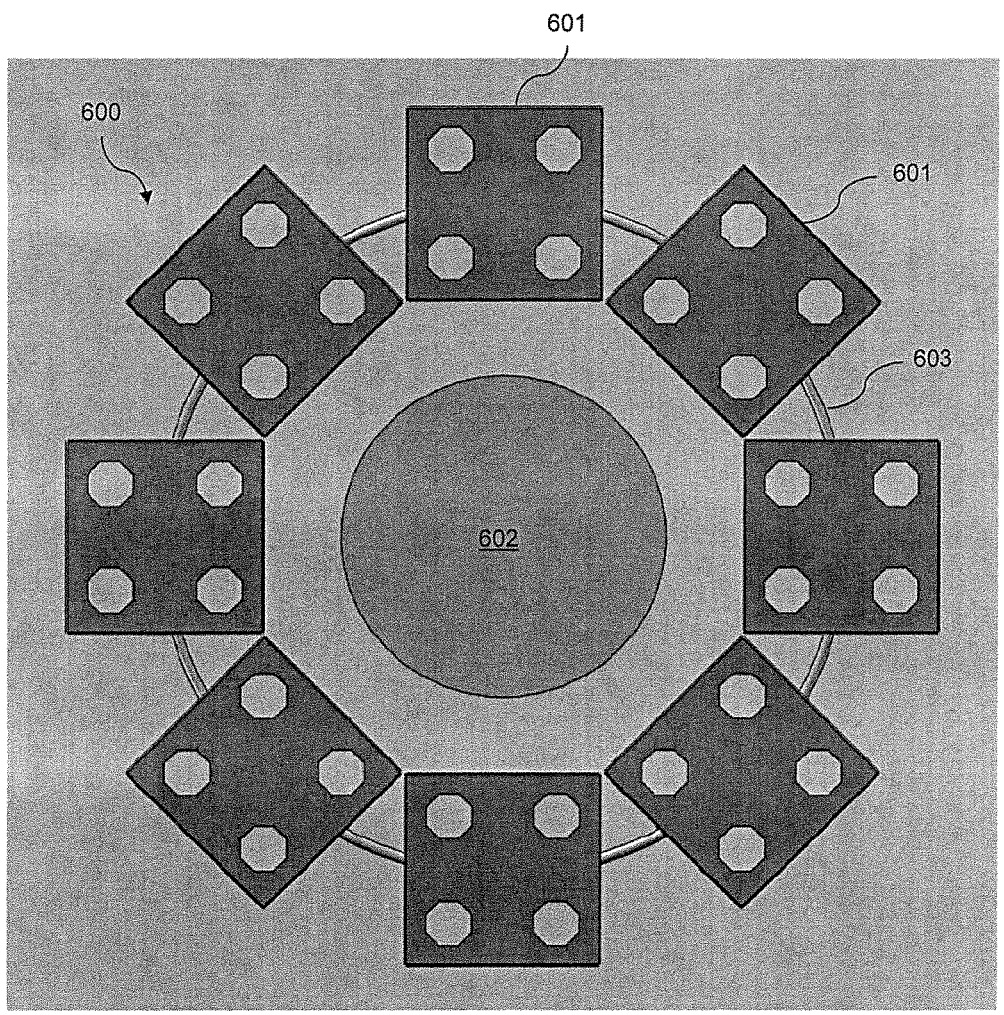
FIG. 4 shows a plan view of a modular safety device in accordance with another preferred embodiment which includes a number of energy absorbing devices shown in FIG. 1.

FIG. 4 shows a modular safety device 600 which has number of modular energy absorbing devices 601 which surround the trunk of a tree 602. The energy absorbing devices 601 have apertures in the form of an integrally moulded tube (not shown) which passes from side to side to enable connection of adjacent energy absorbing devices 601. The energy absorbing devices 601 are connected via a cable 603 which is threaded through adjacent energy absorbing devices which are then wrapped around a tree and the two cable ends are clamped together so as to form a ring.

Figure 5:
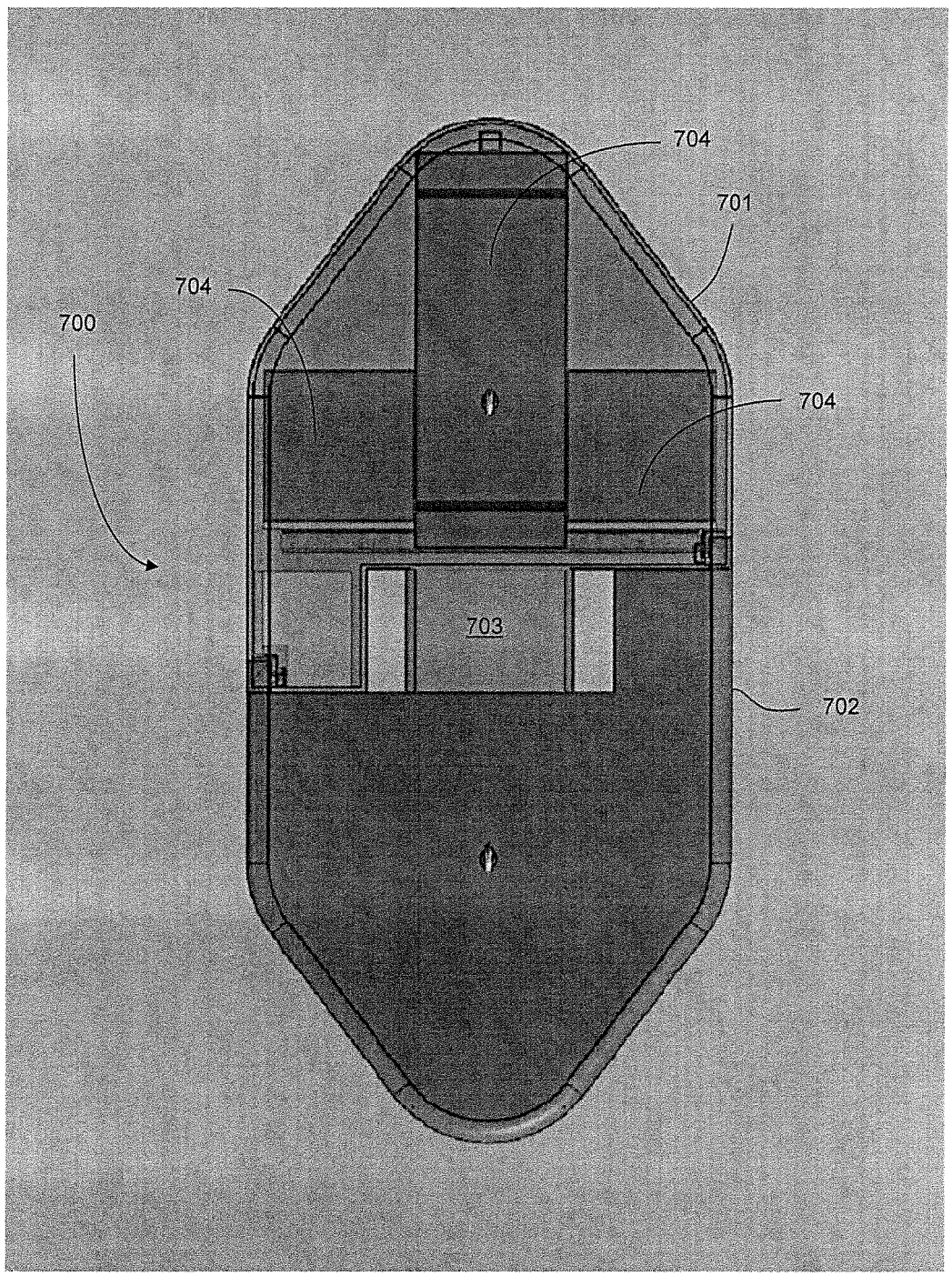
FIG. 5 shows a plan view of a housing which includes a number of energy absorbing devices as shown in FIG. 1 in accordance with a still further preferred embodiment of the present invention.

FIG. 5 shows an alternate modular safety device 700. The modular safety device 700 has a first housing 701 connected via bolts (not shown) to a second housing 702. The modular safety device 700 surrounds a power pole 703. The first housing 701 has had the top of the housing removed in order to show the energy absorbing devices 704 which are located therein. As can be seen the centrally located energy absorbing device of which only the top one of a stack of two can be seen is horizontally orientated (i.e. lying down). By way of contrast the side energy absorbing devices on either side of the centrally positioned stack of devices are orientated vertically (i.e. standing up).

Aspects of the present invention have been described by way of example only and it should be appreciated that modifications and additions may be made thereto without departing from the scope of the appended claims.

What we claim is:

1. A method of absorbing energy from a moving object upon impact, wherein the method comprises the step of:
   utilizing at least two types of energy absorbing elements to absorb at least some of the energy of the impact in an energy absorbing apparatus,
   wherein a first type of energy absorbing element includes a first sealed volume and absorbs a majority of the energy absorbed by the apparatus by a first compression step of a compressing fluid contained within the first sealed volume, the first type of energy absorbing element is in the form of a shell comprising at least one external wall and dissipates said majority of the energy absorbed by the apparatus, and
   wherein at least one subsequent type of energy absorbing element continues to absorb energy after the first type of energy absorbing element has ceased operation and can no longer absorb energy via a second compression step compressing said at least one subsequent type of energy absorbing element,
   wherein the first type of energy absorbing element absorbs energy until the first sealed volume becomes no longer sealed,
   wherein the shell defines the first sealed volume, and the first type of energy absorbing element absorbs energy, at least in part, by compression of the fluid within the shell, until the shell ruptures,
   wherein the subsequent types of energy absorbing elements include a second type of energy absorbing element that absorbs energy, at least in part, by being crushed,
   wherein the second type of energy absorbing element includes one or more interior walls within the energy absorbing apparatus, further defining the shell, and
   wherein the subsequent types of energy absorbing elements include a second sealed volume containing a fluid within the interior walls, and absorb energy at least in part by compression of the fluid in the second sealed volume, followed by crushing of the interior walls.

2. The method as claimed in claim 1, wherein the fluid is a gas.

3. The method as claimed in claim 1, wherein the fluid is air.

4. The method as claimed in claim 1, wherein the interior walls are substantially tubular in shape and integrally formed with the shell, and wherein the interior walls extend across the shell along a major dimension of the shell.

5. The method as claimed in claim 1, wherein prior to the first type of energy absorbing element ceasing operation, the first type of energy absorbing element absorbs between 50%-90% of the energy absorbed by the apparatus.

6. An energy absorbing apparatus for absorbing energy from a moving object upon impact, comprising:
   at least two types of energy absorbing elements configured to absorb at least some of the energy of the impact,
   wherein a first type of energy absorbing element is formed by one or more external walls of the apparatus, defining an enclosed volume encompassing:
   a fluid; and
   a subsequent type of energy absorbing element,
   wherein the subsequent type of energy absorbing element is formed by a plurality of interior walls, the interior walls and the one or more external walls being integrally formed and together defining a single unitary shell defining the enclosed volume, wherein each interior wall forms a tube spanning between opposing sides of the shell, and wherein the tubes are spaced apart in the enclosed volume so that each is surrounded by the fluid,
   wherein the first energy absorbing element absorbs and dissipates the majority of the energy absorbed by the apparatus by compression of the fluid contained within the enclosed volume until the shell ruptures, and
   wherein the subsequent type of energy absorbing element continues to absorb energy after the first energy absorbing element has ceased operation and can no longer absorb energy.

7. A housing adapted for surrounding stationary objects, said housing including a plurality of energy absorbing devices apparatuses as claimed in claim 6.

8. The energy absorbing apparatus of claim 6, wherein each tube is deformable to absorb energy following rupture of the one or more external walls of the shell.

9. The energy absorbing apparatus of claim 6, wherein the fluid is a gas.

10. The energy absorbing apparatus of claim 9, wherein the fluid is air.

11. The energy absorbing apparatus of claim 6, wherein the first type of energy absorbing element absorbs energy by compression of the fluid within the shell until the one or more external walls of the shell ruptures.

12. The energy absorbing apparatus of claim 6, wherein the tubes absorb energy at least in part by being crushed.

13. The energy absorbing apparatus of claim 6, wherein the tubes extend across the enclosed volume along a major dimension of the shell.

14. The energy absorbing apparatus of claim 6, wherein the tubes form a second enclosed volume containing a fluid, and wherein the second type of energy absorbing element absorbs energy at least in part by compression of the fluid in the second enclosed volume, followed by crushing of the interior walls.

* * * * *